No. 774,116. PATENTED NOV. 1, 1904.
A. G. STEVENS.
CHEMICAL FIRE EXTINGUISHER.
APPLICATION FILED FEB. 4, 1904.
NO MODEL.

Witnesses
H. B. Hallak
L. H. Morrison

Inventor:
Albert G. Stevens
By Peter Williams
Atty

No. 774,116. Patented November 1, 1904.

UNITED STATES PATENT OFFICE.

ALBERT G. STEVENS, OF CAPE MAY, NEW JERSEY.

CHEMICAL FIRE-EXTINGUISHER.

SPECIFICATION forming part of Letters Patent No. 774,116, dated November 1, 1904.

Application filed February 4, 1904. Serial No. 192,056. (No model.)

*To all whom it may concern:*

Be it known that I, ALBERT G. STEVENS, a citizen of the United States, residing at Cape May city, county of Cape May, and State of New Jersey, have invented a certain new and useful Improvement in Chemical Fire-Extinguishers, of which the following is a specification.

My invention relates to a new and useful improvement in chemical fire-extinguishers, and has for its object to provide a fire-extinguisher in one portion of which the chemicals are mixed and when the water is turned through this portion the chemicals will mix with the water and be carried out of the machine.

This patent is intended as an improvement over patent granted to me December 29, 1903, No. 748,319, for chemical-mixer.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
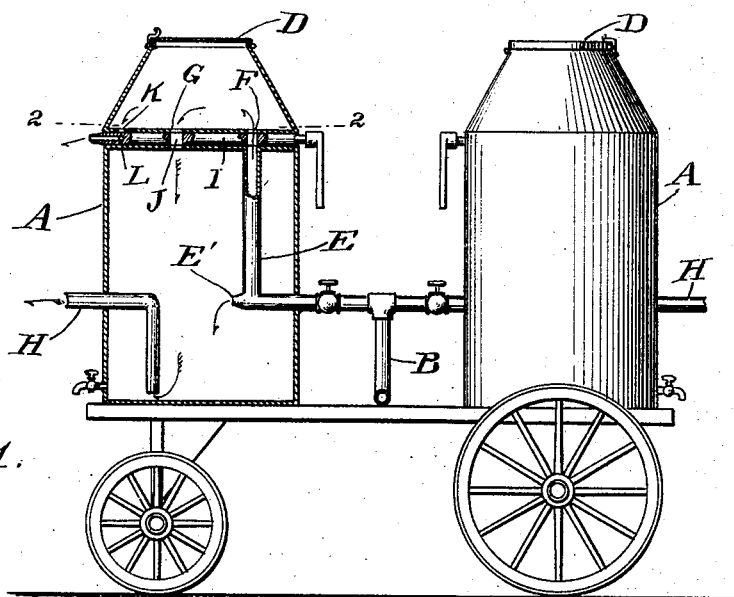
Figure 2:
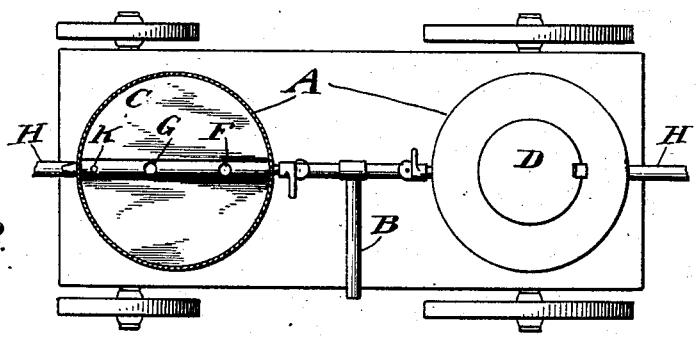
Figure 3:
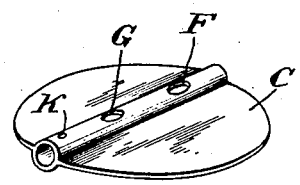
Figure 4:
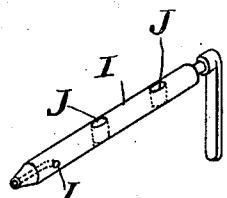

Figure 1 is a side elevation of a truck having two mixing-chambers located thereon, one being shown in section; Fig. 2, a plan view of Fig. 1, one of the mixing-chambers being shown in section, the section being taken on the line 2 2 of Fig. 1; Fig. 3, a perspective view of the partition dividing the chemical-chamber from the water-chamber below. Fig. 4, a perspective view of the valve-plug.

A represents the mixing-chambers, which may be either stationary or mounted upon a truck, as shown in the drawings. There may be as many of these mixing-chambers located in a group as desired, all being connected to a pipe B with a common water-supply. Each of the mixing-chambers A is divided horizontally in two parts by the partition C. The space above the partition C, I will call the "chemical-chamber," as that is the chamber in which the chemicals are placed through the removable lid D. This lid D is normally securely held in place and will be packed so the same will be water-tight. The space below the partition C, I will call the "water-chamber," as said chamber is always full of water while the apparatus is being used.

E represents pipes branching from the main supply-pipe B and leading into the water-chamber of each mixer. The pipes E after entering the chamber extend upward and connect with the chemical-chamber through openings F, formed through the partition C. G is another opening formed through the partition C, through which the water entering the chemical-chamber may pass through into the water-chamber below, the water then passing outward through the outlet-pipe H, said outlet-pipe taking its supply from near the bottom of the water-chamber. The outlet-pipes of each mixer will be merged into one after leaving the mixers.

I is a valve-plug passing horizontally through the partition C, intercepting the holes F and G. The valve-plug is provided with lateral openings J formed therethrough, which may be brought in or out of register with the openings F and G by turning the plug.

K is a small opening through the upper portion of the valve-casing, and in the end of the plug-valve is located a port L, which extends from the side of said plug-valve outward through the end of the same, and as the end of the plug-valve extends outside of the casing of the mixer when the port L is brought into register with the opening K any water in the chemical-chamber will flow outward through the opening K and port L to the exterior of the machine. The port L is so located that it is only in register with the opening K when the openings J are out of register with the openings F and G.

E' is a contracted opening from the pipe E, opening directly into the water-chamber.

The operation of the device is as follows: Water being turned into the supply-pipe B, said water will flow through the pipes E, and part of the water will issue from the opening E' into the water-chamber and part will flow upward through the chemical-chamber into the water-chamber, and the water will flow outward through the outlet-pipe H. In order to recharge the mixer, the plug I is turned one-quarter revolution, which will close off the supply of water to the chemical-chamber and allow the water to drain out of the chemical-chamber through the port L. Then the lid D is opened and the chemical-chamber filled with the proper chemicals. Then the plug I is turned back so that the openings J will register with the openings F and G. Then a certain amount of water will pass upward through the chemical-chamber, carrying part of the chemicals with it, so that the water issuing from the outlet-pipe H will be charged with the proper supply of chemical. Water flowing through the chemical-chamber may be regulated by the valve I.

The reason for having two or more mixers in one apparatus is for the purpose of having the water always flowing through a chemically-charged chamber, for while the water is taking chemical from the chamber of one mixer the water may be turned off from the chemical-chamber of another mixer and this chamber charged, so that by the time one chamber is empty another is reached to be turned on.

Of course I do not wish to be limited to the exact construction here shown, as slight modifications could be made without departing from the spirit of my invention.

Having thus fully described my invention, what I claim as new and useful is—

1. In a fire-extinguishing apparatus, a casing divided horizontally into the two chambers, the upper chamber provided with a removable cover adapted to be normally hermetically sealed in place, a water-supply pipe leading into the upper chamber, a port formed through the partition dividing the two chambers, a valve for opening or closing said port, and at the same time opening or closing the water-supply to the upper chamber, the supply-pipe also opening through a contracted opening into the lower chamber, an outlet-pipe leading from the lower chamber, and a valve for draining the water from the upper chamber when the water-supply is cut off from the same, as and for the purpose specified.

2. In a chemical fire-extinguishing apparatus consisting of two or more mixing-reservoirs, each mixing-reservoir consisting of a casing divided horizontally by a partition into two chambers, the upper chamber provided with a removable cover through which the chemicals may be inserted, said cover adapted to be normally held closed against the egress of water, a common supply-pipe, branch pipes leading from said supply-pipe into the lower chamber of each reservoir and opening into said lower chamber through a contracted opening, said branch pipes also extending upward and opening into the upper chamber through a supply-port formed through the partition, an outlet-port also formed through a partition connecting the upper and lower chambers, a valve adapted to open or close both of said ports at the same time, a valve for draining the water from the upper chamber to the exterior of the reservoir when the ports in the partition are closed, and an outlet-pipe leading from the lower chamber of each reservoir, as and for the purpose specified.

3. A chemical fire-extinguishing apparatus consisting of two or more mixing-reservoirs, each mixing-reservoir consisting of a casing divided horizontally into two chambers, the upper end of the upper chamber being open and normally closed water-tight by a removable cover, a valve-casing formed through the partition, a plug-valve fitted within the valve-casing, a common supply-pipe, branch pipes leading from said supply-pipe into the lower chamber of each of the reservoirs and opening into said chamber through a contracted opening, said pipes also extending upward and connecting with ports formed through the valve-casing in the partition, said valve-casings also provided with other ports adapted to connect the chemical-chamber with the water-chamber, openings provided through the valve-plug in the valve-casing adapted to be brought in and out of register with the ports of the valve-casing, and a port extending from the side of the valve-plug through the end of the same to the exterior of the reservoir, said port adapted to be brought in register with the port connecting with the upper chamber when the valve-plug is turned so as to close the other ports, as and for the purpose specified.

In testimony whereof I have hereunto affixed my signature in the presence of two subscribing witnesses.

ALBERT G. STEVENS.

Witnesses:
CLIFFORD D. WALTERS,
GEORGE SANDGRAN.